United States Patent
Yamamoto

(10) Patent No.: US 6,191,396 B1
(45) Date of Patent: Feb. 20, 2001

(54) HEATER ABNORMALITY DETECTING CIRCUIT

(75) Inventor: Kazuhiko Yamamoto, Daito (JP)

(73) Assignee: Funai Electric Co. Ltd., Osaka (JP)

( * ) Notice: Under 35 U.S.C. 154(b), the term of this patent shall be extended for 0 days.

(21) Appl. No.: 09/193,464

(22) Filed: Nov. 17, 1998

(30) Foreign Application Priority Data

Nov. 19, 1997 (JP) .................................................. 9-317819

(51) Int. Cl.[7] .................................................. H05B 1/02
(52) U.S. Cl. .......................... 219/481; 219/492; 219/497; 361/35
(58) Field of Search .................................. 219/481, 501, 219/505, 497, 494, 508, 499, 492; 36/20, 35; 323/355

(56) References Cited

U.S. PATENT DOCUMENTS

| | | | |
|---|---|---|---|
| 3,774,069 | * 11/1973 | Yasumatsuya | 315/27 R |
| 4,281,372 | * 7/1981 | Kornrumpf | 219/10.55 D |
| 4,814,878 | * 3/1989 | Kishi et al. | 358/158 |
| 5,708,254 | * 1/1998 | Ikegami et al. | 219/133 |

* cited by examiner

Primary Examiner—Mark Paschall

(57) ABSTRACT

A heater abnormality detecting circuit includes a heater winding. A fly back pulse extracted by the heater winding is supplied to a heater through a heater resistor, and voltage-divided and supplied to a micro-computer. The micro-computer determines a normality or abnormality on the heater by determining whether or not it is inputted with the voltage-divided fly back pulse in a predetermined time period.

6 Claims, 3 Drawing Sheets

F I G. 1
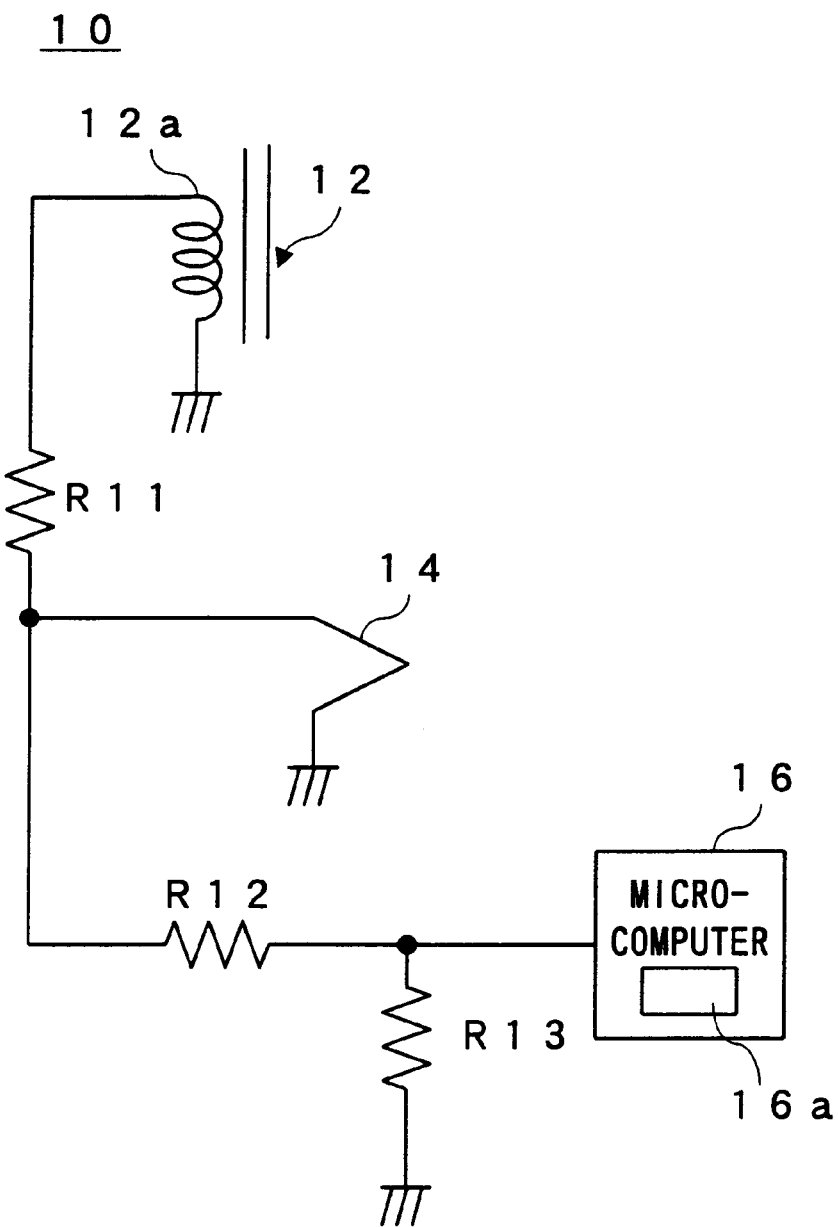

HEATER ABNORMALITY DETECTING CIRCUIT

BACKGROUND OF THE INVENTION

1. Field of the Invention

This invention relates to heater abnormality detecting circuits, and more particularly to a CRT heater abnormality detecting circuit used, for example, for television receivers, display units and so on.

2. Description of the Prior Art

In a conventional heater abnormality detecting circuit 1 shown in FIG. 3, normality or abnormality is determined based on a level of a bias voltage detected by a micro-computer 2. That is, if the heater 3 is normal, a fly back pulse (FB pulse) extracted on a heater winding 4 is supplied to the heater 3 through a heater register R1, and also rectified by a diode D1 so that a voltage taken by an electrolytic capacitor C1 is voltage-divided by resistors R2 and R3. Accordingly, an electric current flows through the resistor R3 and a diode D2 is turned on, thereby causing a bias current flowing through the resistor R3. That is, there is a decrease in level of a bias voltage detected by the micro-computer 2.

On the other hand, in the event that the heater be short circuited, an FB pulse extracted on the heater winding 4 is supplied to the heater resistor R1, and also to a ground through the short-circuited heater 3. Due to this, the diode D2 will not turn on with a result that the micro-computer 2 detects a bias voltage that is dropped in voltage from a bias B through a resistor R4. Accordingly, the bias voltage is higher in level as compared with the case that the heater 3 is normal.

In this prior art, however, the FB pulse is rectified by the diode D1 so that a voltage taken by electrolytic capacitor C1 is voltage-divided by the resistors R2 and R3. Also, the diode D2 is provided in order to prevent a bias current from flowing into the micro-computer 2 (prevention against reverse current flow). Thus there is a necessity to provide an element to extract as a voltage an FB pulse, an element to prevent against current reverse flow, and so on Thus, the number of parts required is increased, resulting in mounting up of cost.

Furthermore, the electrolytic capacitor C1 and the resistor R2 might form a CR circuit. Due to a presence of a time constant of this CR circuit, the determination of normality or abnormality on the heater 3 is delayed by several msecs. Thus there is a disadvantage that there is delay in detecting an abnormality in the heater 3 resulting in possible smoking from the heater resistor R1.

SUMMARY OF THE INVENTION

Therefore, it is a primary object of the present invention to provide a novel heater abnormality detecting circuit.

It is another object of the present invention to provide at low cost a heater abnormality detecting circuit which can rapidly detect an abnormality.

An abnormality detecting circuit according to the present invention, comprises: a fly back pulse extracting means for extracting a fly back pulse out of heater winding of a fly back transformer; and a detecting means to be inputted with the fly back pulse extracted by the extracting means, the extracting means determining whether or not the fly back pulse has been inputted in a predetermined time period.

In a preferred embodiment, the fly back pulse extracting means includes a resistor means connected in series to the heater winding. The fly back pulse extracting means includes level reducing means for reducing in voltage level the fly back pulse outputted from the resistor means, and the detecting means receiving the fly back pulse reduced in voltage level from the level reducing means.

The level reducing means includes, concretely, a voltage-dividing means including a first resistor having one end directly connected to one end of the resistor means and the other end, and a second resistor having one end connecting to the other end of the first resistor and the other end connected to a reference potential, whereby the fly back pulse is supplied from connection point between the first resistor and the second resistor to the detecting means.

The fly back pulse, extracted through the heater winding of the fly back transformer (FBT) by the fly back extracting means, is supplied to the heater and also to the detecting means. The fly back pulse is preferably given to the detecting means through the level reducing means, such as a voltage-dividing means (voltage-dividing resistor). The detecting means is, for example, a micro-computer. The micro-computer determined as to whether or not a level-reduced fly back pulse is inputted in a predetermined time period. The fly back pulse, when the heater is normal, is inputted for example every 63 micro-seconds. If there is an abnormality such as short circuit in the heater, no fly back pulse is inputted to the detecting means. It is therefore possible to detect heater abnormality by detecting a time period that a fly back pulse is inputted.

According to the present invention, the number of component parts is reduced as compared with that of the conventional, and hence cheap in cost. Also, because no time constant circuit is included, detection of abnormality is rapidly made.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a circuit diagram showing one embodiment of the present invention;

DETAILED DESCRIPTION OF THE PREFERRED EMBODIMENT

Figure 2:
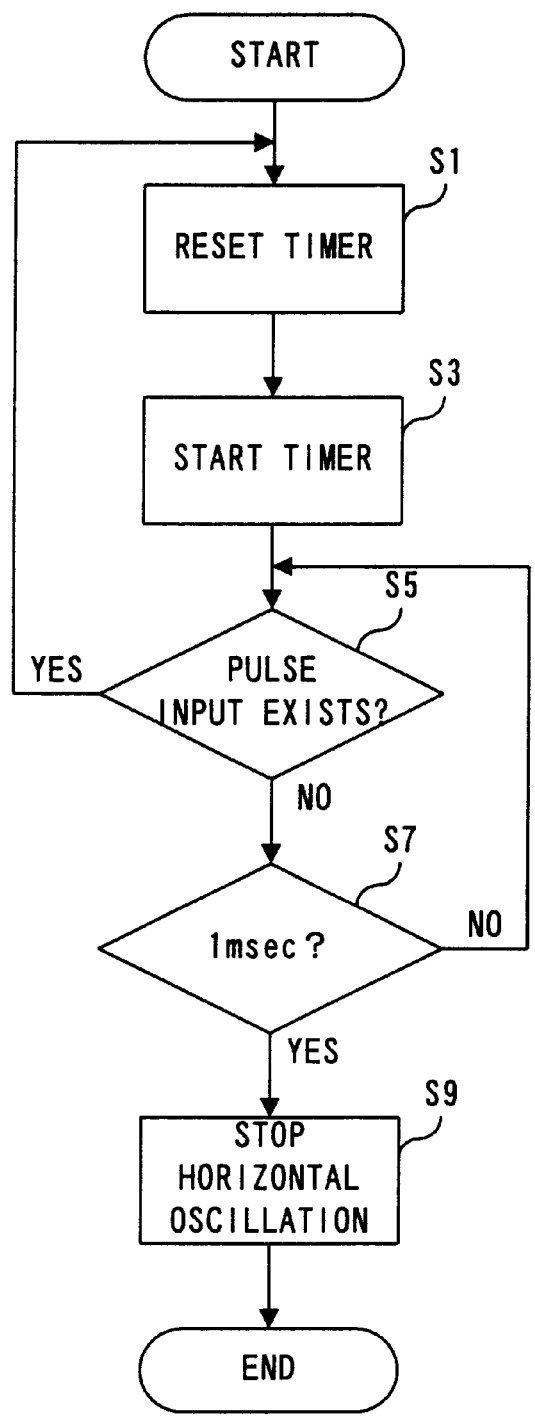
FIG. 2 is a flowchart showing part of a micro-computer process shown in the FIG. 1 embodiment.

Referring to FIG. 1, a heater abnormality detecting circuit 10 in this embodiment includes a fly back transformer (FBT) 12. The FBT 12 has a heater winding 12a to extract an FB pulse (approximately 15.75 KHz). This FB pulse is supplied to a heater 14 through a heater resistor R11, and also voltage-divided by resistors R12 and R13 and then supplied to a micro-computer 16. That is, the FB pulse is adjusted into a wave height value inputtable to the micro-computer 16 by the resistors R12 and R13. The micro-computer 16 determines a normality or abnormality on the heater 14 by determining whether or not the voltage-divided FB pulse is inputted thereto in a predetermined time period (1 msec in this embodiment).

When the heater 14 is normal, the FB pulse passed through the heater resistance R2 is given to the micro-computer 16. However, if the heater 14 is abnormal (in a state of short circuit), an FB pulse is supplied to a ground through the heater resistor R11 and the short-circuited heater 14. That is, when the heater is abnormal, the micro-computer 16 is not supplied with an FB pulse. Accordingly, the microcomputer 16 stops of horizontal oscillation, e.g. turns off a power for a television receiver, to thereby prevent the heater resistor R11 from being damaged.

The micro-computer 16 carries out the above stated operation according to a flowchart shown in FIG. 2. If the power for the television receiver is turned on, the process is started. At a step S1 a timer 16a is reset. At a succeeding step S3 the timer 16a is started. At a step S5 it is determined whether an FB pulse is inputted through the resistors R12 and R13 or not. If "YES" here, the heater is determined normal, and the process returns to the step S1. However, if "NO", it is determined at a step S7 whether 1 msec has been elapsed or not. If "NO" here, the process returns to a step S5. If "YES", the heater 14 is abnormal is determined, and then horizontal oscillation is stopped at a step S9, ending the process.

Figure 3:
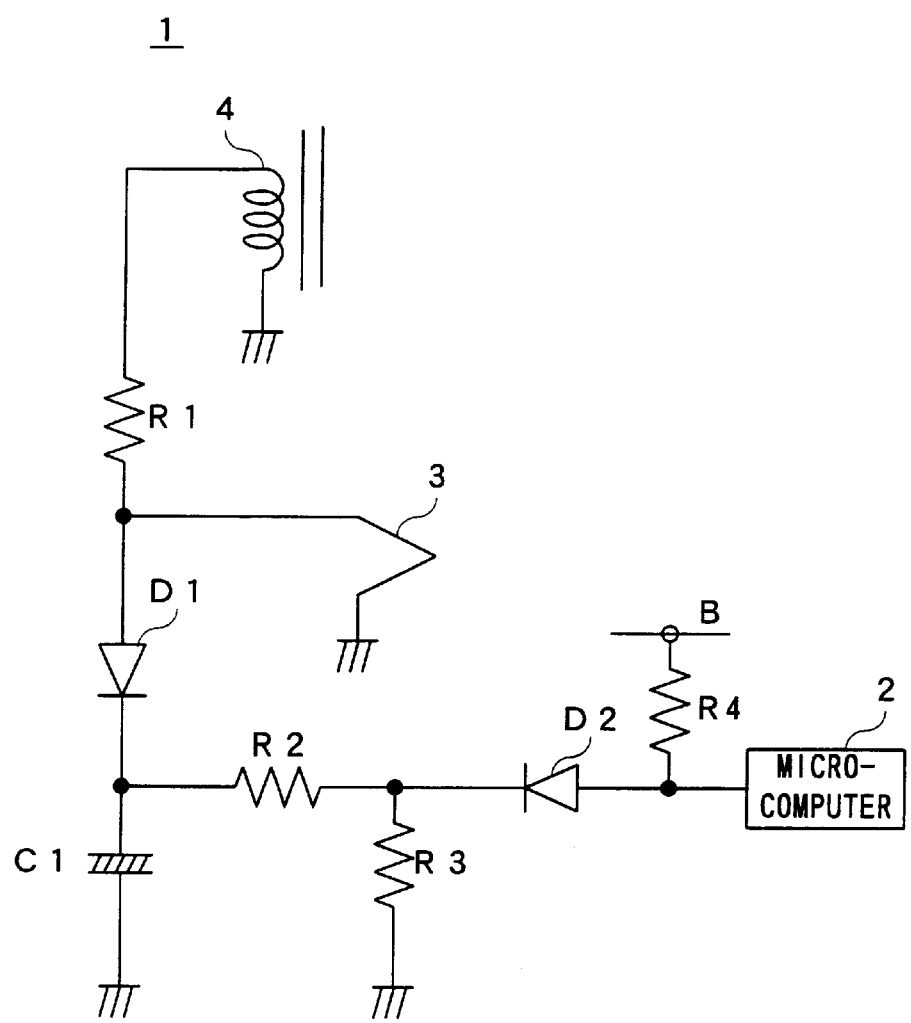
FIG. 3 is a circuit diagram showing a conventional heater abnormality detecting circuit.

This embodiment is reduced in number of component parts and cheap in cost as compared with the conventional heater abnormality detecting circuit 1 as shown in FIG. 3. An abnormality of the heater 14 can be rapidly detected because no time constant circuit is included therein.

Incidentally, in this embodiment, in the event that an abnormality is detected in the heater 14, horizontal oscillation was stopped to turn on the television receiver power. Alternatively, a relay for example, may be provided on a primary side of a power supply circuit in the television receiver so that this relay is turned off when detecting an abnormality.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An abnormality detecting circuit, comprising:
   a fly back pulse extracting means for extracting a fly back pulse out of a winding of a fly back transformer connected to energize a heater of a CRT; and
   a detecting means for receiving a fly back pulse extracted by said extracting means, said detecting means including means for determining an abnormality of said fly back transformer by detecting whether or not the fly back pulse has been inputted in a predetermined time period.

2. An abnormality detecting circuit according to claim 1, wherein said fly back pulse extracting means includes a resistor means connected in series to said heater winding.

3. An abnormality detecting circuit according to claim 2, wherein said fly back pulse extracting means includes level reducing means for reducing in voltage level the fly back pulse outputted from said resistor means, and said detecting means receiving the fly back pulse reduced in voltage level from said level reducing means.

4. An abnormality detecting circuit according to claim 3, wherein said level reducing means includes a voltage-dividing means including a first resistor having one end directly connected to one end of said resistor means and the other end, and a second resistor having one end connecting to the other end of said first resistor and the other end connected to a reference potential, whereby the fly back pulse is supplied from connection point between said first resistor and said second resistor to said detecting means.

5. An abnormality detecting circuit according to claim 4, wherein said detecting means includes a micro-computer.

6. An abnormality detecting circuit, comprising:
   a fly back pulse extracting means for extracting a fly back pulse out of a winding of a fly back transformer, said winding being arranged to energize a heater of a CRT; and
   a detecting means connected to said fly back pulse and having an input for receiving a fly back pulse extracted by said extracting means, said detecting means including means for determining an abnormality of said fly back transformer by substantially immediately detecting whether or not the fly back pulse has been inputted in a predetermined time period.

\* \* \* \* \*